(12) United States Patent
Jiang et al.

(10) Patent No.: US 9,313,677 B2
(45) Date of Patent: Apr. 12, 2016

(54) METHOD AND SYSTEM FOR SENDING A CHANNEL MEASUREMENT REFERENCE SIGNAL

(75) Inventors: Jing Jiang, Guangdong (CN);
Changqing Zhu, Guangdong (CN);
Chenchen Zhang, Guangdong (CN)

(73) Assignee: ZTE Corporation, Shenzhen, Guangdong (CN)

( * ) Notice: Subject to any disclaimer, the term of this patent is extended or adjusted under 35 U.S.C. 154(b) by 125 days.

(21) Appl. No.: 13/259,813

(22) PCT Filed: May 10, 2010

(86) PCT No.: PCT/CN2010/072586
§ 371 (c)(1),
(2), (4) Date: Feb. 17, 2012

(87) PCT Pub. No.: WO2011/020342
PCT Pub. Date: Feb. 24, 2011

(65) Prior Publication Data
US 2012/0140718 A1      Jun. 7, 2012

(30) Foreign Application Priority Data
Aug. 18, 2009  (CN) .......................... 2009 1 0166177

(51) Int. Cl.
*H04W 72/04*      (2009.01)
*H04W 24/10*      (2009.01)
*H04L 5/00*       (2006.01)
*H04L 25/02*      (2006.01)

(52) U.S. Cl.
CPC ............. *H04W 24/10* (2013.01); *H04L 5/0048* (2013.01); *H04L 25/0228* (2013.01)

(58) Field of Classification Search
CPC ....................................................... H04W 24/10
See application file for complete search history.

(56) References Cited

U.S. PATENT DOCUMENTS

| 2009/0034484 | A1 | 2/2009 | Kong et al. |
| 2009/0041151 | A1 | 2/2009 | Khan et al. |
| 2010/0238877 | A1* | 9/2010 | Nam et al. ..................... 370/329 |
| 2012/0008522 | A1 | 1/2012 | Ng |
| 2012/0257553 | A1* | 10/2012 | Noh et al. ..................... 370/280 |
| 2012/0315859 | A1* | 12/2012 | Lee et al. ................... 455/67.13 |

FOREIGN PATENT DOCUMENTS

| CN | 101162987 A | 4/2008 |
| CN | 101184073 A | 5/2008 |
| CN | 101286762 A | 10/2008 |
| EP | 2045952 A2 | 4/2009 |
| JP | 2012521101 A | 9/2012 |
| WO | 2008054128 A1 | 5/2008 |
| WO | 2008115614 A2 | 9/2008 |

OTHER PUBLICATIONS

3GPP TSG-RAN Working Group 1 Meeting #57, "DL Reference Signal Design for CSI generation in LTE-Advanced", May 4-8, 2009.
3GPP TSG-RAN WG1 Meeting #56bis, "CQI-RS for LTE-Advanced", R1-091221, Mar. 23-27, 2009, Seoul, Korea.

* cited by examiner

*Primary Examiner* — Huy D Vu
*Assistant Examiner* — Teisha D Hall
(74) *Attorney, Agent, or Firm* — Walker & Jocke

(57) ABSTRACT

A method and system for sending a channel measurement reference signal are provided, said method comprising: sending each port of the channel measurement reference signal in one subframe or two adjacent subframes during one sending period, and repeatedly sending each port of the channel measurement reference signal in full bandwidth with equal space in the unit of a predetermined composition unit.

19 Claims, 11 Drawing Sheets pilot pattern in the LTE normal cyclic frame structure physical resource block pilot pattern in the LTE normal cyclic
frame structure physical resource block pilot pattern in the LTE normal cyclic frame structure physical resource block

METHOD AND SYSTEM FOR SENDING A CHANNEL MEASUREMENT REFERENCE SIGNAL

FIELD OF THE INVENTION

The present invention relates to wireless communication systems and, in particular, is especially suitable for a method and system for sending a channel measurement reference signal on the LTE and LTE-Advanced user shared resources in the LTE-A.

BACKGROUND OF THE INVENTION

In order to increase the throughput of cells and coordinate interference among cells, new generation wireless communication systems, such as Long-Term Evolution advance (abbreviated as LTE-Advance) system, International Mobile Telecommunication advance (abbreviated as IMT-Advance) system, etc., all introduce the Coordinate Multipoint Transmission and Reception (abbreviated as COMP hereafter) technology at network levels.

Two kinds of reference signals of the LTE-Advanced are defined at the 56th conference of 3GPP LTE: channel measurement reference signal (abbreviated as CSI-RS hereafter) and demodulation reference signal (abbreviated as DMRS hereafter), wherein the channel measurement reference signal is clearly defined as cell-specific, and relatively speaking, the channel measurement reference signal is distributed more sparsely on time frequency resources.

However, how the channel measurement reference signal works in the LTE-A system and its mapping rules are not defined in details.

SUMMARY OF THE INVENTION

The main object of the present invention is to provide a particular solution for designing a channel measurement reference signal so as to solve at least one of the above problems.

A method for sending a channel measurement reference signal is provided according to one aspect of the present invention, in which each port of the channel measurement reference signal is sent using one subframe or two adjacent subframes during one sending period and each port of the channel measurement reference signal is sent repeatedly in full bandwidth with equal space in the unit of a predetermined composition unit.

In this case, channel measurement reference signals with $\{1, 2, 4, 8\}$ port(s) are newly designed, in which the pattern of the channel measurement reference signal with 1 port and that of the first port of the channel measurement reference signal with 2 ports are the same, the pattern of the channel measurement reference signal with 2 ports and that of the first 2 ports of the channel measurement reference signal with 4 ports are the same, and the frequency domain space of the equal space that the channel measurement reference signal predetermined composition unit is repeated with is $\{6, 8, 12, 16, 24, 30, 36, 42, 48\}$.

The newly designed channel measurement reference signals are sent repeatedly in full bandwidth with equal space by taking one RB as the predetermined composition unit, and the channel measurement reference signal with 8 ports is located on the $14^{th}$ OFDM symbol of the sending subframe, wherein the 0-port and 1-port of the channel measurement reference signal are mapped on the $1^{st}$ and $2^{nd}$ subcarriers adjacently, the 2-port and 3-port of the channel measurement reference signal are mapped on the $4^{th}$ and $5^{th}$ subcarriers adjacently, the 4-port and 5-port of the channel measurement reference signal are mapped on the $7^{th}$ and $8^{th}$ subcarriers adjacently, and the 6-port and 7-port of the channel measurement reference signal are mapped on the $10^{th}$ and $11^{th}$ subcarriers adjacently.

Furthermore, the newly designed channel measurement reference signals are sent repeatedly in full bandwidth with equal space by taking two RBs as the predetermined composition unit, and the channel measurement reference signal with 8 ports is located on the $14^{th}$ OFDM symbol of the sending subframe, wherein the 0 port of the channel measurement reference signal is mapped on the $1^{st}$, $9^{th}$, and $17^{th}$ subcarriers, the 1-port of the channel measurement reference signal is mapped on the $2^{nd}$, $10^{th}$, and $18^{th}$ subcarriers, the 2-port of the channel measurement reference signal is mapped on the $3^{rd}$, $11^{th}$, and $19^{th}$ subcarriers, the 3-port of the channel measurement reference signal is mapped on the $4^{th}$, $12^{th}$, and $20^{th}$ subcarriers, the 4-port of the channel measurement reference signal is mapped on the $5^{th}$, $13^{th}$, and $21^{st}$ subcarriers, the 5-port of the channel measurement reference signal is mapped on the $6^{th}$, $14^{th}$, and $22^{nd}$ subcarriers, the 6-port of the channel measurement reference signal is mapped on the $7^{th}$, $15^{th}$, and $23^{rd}$ subcarriers, and the 7-port of the channel measurement reference signal is mapped on the $8^{th}$, $16^{th}$, and $24^{th}$ subcarriers.

Furthermore, the newly designed channel measurement reference signals are sent repeatedly in full bandwidth with equal space by taking one RB as the predetermined composition unit, and the channel measurement reference signal with 8 ports is located on the $11^{th}$ and $14^{th}$ OFDM symbols of the sending subframe, wherein on the $11^{th}$ symbol, the 0-port and 1-port of the channel measurement reference signal are mapped on the $1^{st}$ and $2^{nd}$ subcarriers adjacently, the 2-port and 3-port of the channel measurement reference signal are mapped on the $4^{th}$ and $5^{th}$ subcarriers adjacently, the 4-port and 5-port of the channel measurement reference signal are mapped on the $7^{th}$ and $8^{th}$ subcarriers adjacently, and the 6-port and 7-port of the channel measurement reference signal are mapped on the $10^{th}$ and $11^{th}$ subcarriers adjacently; and on the $14^{th}$ OFDN symbol, the 0-port and 1-port of the channel measurement reference signal are mapped on the $7^{th}$ and $8^{th}$ subcarriers of the $14^{th}$ symbol adjacently, the 2-port and 3-port of the channel measurement reference signal are mapped on the $10^{th}$ and $11^{th}$ subcarriers of the $14^{th}$ symbol adjacently, the 4-port and 5-port of the channel measurement reference signal are mapped on the $1^{st}$ and $2^{nd}$ subcarriers of the $14^{th}$ symbol adjacently, and the 6-port and 7-port of the channel measurement reference signal are mapped on the $4^{th}$ and $5^{th}$ subcarriers of the $14^{th}$ symbol adjacently.

Furthermore, the newly designed channel measurement reference signals are sent repeatedly in full bandwidth with equal space by taking two RBs as the predetermined composition unit, and the channel measurement reference signal with 8 ports is located on the $14^{th}$ OFDM symbol of the sending subframe, wherein the 0-port of the channel measurement reference signal is mapped on the $3^{rd}$ subcarrier, the 1-port of the channel measurement reference signal is mapped on the $6^{th}$ subcarrier, the 2-port of the channel measurement reference signal is mapped on the $9^{th}$ subcarrier, the 3-port of the channel measurement reference signal is mapped on the $12^{th}$ subcarrier, the 4-port of the channel measurement reference signal is mapped on the $15^{th}$ subcarrier, the 5-port of the channel measurement reference signal is mapped on the $18^{th}$ subcarrier, the 6-port of the channel measurement reference signal is mapped on the $21^{st}$ subcarrier, and the 7-port of the channel measurement reference signal is mapped on the $24^{th}$ subcarrier.

Furthermore, the newly designed channel measurement reference signals are sent repeatedly in full bandwidth with equal space by taking one RB as the predetermined composition unit, and the channel measurement reference signal with 8 ports is located on the $6^{th}$ and $11^{th}$ OFDM symbols of the sending subframe, wherein the 0-port and 4-port of the channel measurement reference signal are mapped on the $1^{st}$ subcarrier, the 1-port and 5-port of the channel measurement reference signal are mapped on the $4^{th}$ subcarrier, the 2-port and 6-port of the channel measurement reference signal are mapped on the $7^{th}$ subcarrier, and the 3-port and 7-port of the channel measurement reference signal are mapped on the $10^{th}$ subcarrier.

In addition, the channel measurement reference signals are sent repeatedly in full bandwidth with equal space by taking one RB as the predetermined composition unit, and the channel measurement reference signal with 8 ports is located on the $6^{th}$ OFDM symbol of the sending subframe, wherein the 0-port and 1-port of the channel measurement reference signal are mapped on the $1^{st}$ and $2^{nd}$ subcarriers adjacently, the 2-port and 3-port of the channel measurement reference signal are mapped on the $7^{th}$ and $8^{th}$ subcarriers adjacently, and the frequency domain locations of the 4-port, 5-port, 6-port, and 7-port of the channel measurement reference signal are the same as those of the 0-port, 1-port, 2-port, and 3-port of the channel measurement reference signal respectively, and each port of the channel measurement reference signal is the same when being configured at different antenna ports and at the same time the mapping of the channel measurement reference signals with 1, 2, 4, and 8 port(s) are supported.

Furthermore, the channel measurement reference signals are sent repeatedly in full bandwidth with equal space by taking one RB as the predetermined composition unit, wherein the channel measurement reference signal with 8 ports is located on the $6^{th}$ and $11^{th}$ OFDM symbols of the sending subframe, the 0-port of CSI-RS is mapped on the $1^{st}$ subcarrier of the $6^{th}$ OFDM symbol, the 1-port of CSI-RS is mapped on the $4^{th}$ subcarrier of the $6^{th}$ OFDM symbol, the 2-port of CSI-RS is mapped on the $7^{th}$ subcarrier of the $6^{th}$ OFDM symbol, the 3-port of CSI-RS is mapped on the $10^{th}$ subcarrier of the $6^{th}$ OFDM symbol; the 4-port of CSI-RS is mapped on the $1^{st}$ subcarrier of the $11^{th}$ OFDM symbol, the 5-port of CSI-RS is mapped on the $4^{th}$ subcarrier of the $11^{th}$ OFDM symbol, the 6-port of CSI-RS is mapped on the $7^{th}$ subcarrier of the $11^{th}$ OFDM symbol, and the 7-port of CSI-RS is mapped on the $10^{th}$ subcarrier of the $11^{th}$ OFDM symbol.

Furthermore, the channel measurement reference signals are sent repeatedly in full bandwidth with equal space by taking one RB as the predetermined composition unit, wherein the channel measurement reference signal with 8 ports is located on the $6^{th}$ and $11^{th}$ OFDM symbols of the sending subframe, the 0-port and 1-port of CSI-RS are mapped on the $1^{st}$ and $2^{nd}$ subcarriers of the $6^{th}$ OFDM symbol adjacently, the 2-port and 3-port of CSI-RS are mapped on the $7^{th}$ and $8^{th}$ subcarriers of the $6^{th}$ OFDM symbol adjacently, and the 4-port, 5-port, 6-port, and 7-port are mapped on the $11^{th}$ symbol, with the frequency domain locations thereof being the same as those of the 0-port, 1-port, 2-port, and 3-port respectively.

Furthermore, the channel measurement reference signals are sent repeatedly in full bandwidth with equal space by taking one RB as the predetermined composition unit, wherein the channel measurement reference signal with 8 ports is located on the $6^{th}$ and $14^{th}$ OFDM symbols of the sending subframe, the 0-port and 1-port of CSI-RS are mapped on the $1^{st}$ and $2^{nd}$ subcarriers of the $6^{th}$ OFDM symbol adjacently, the 2-port and 3-port of CSI-RS are mapped on the $7^{th}$ and $8^{th}$ subcarriers of the $6^{th}$ OFDM symbol adjacently, and the 4-port, 5-port, 6-port, and 7-port are mapped on the $14^{th}$ symbol, with the frequency domain locations thereof being the same as those of the 0-port, 1-port, 2-port, and 3-port respectively.

A system for sending a channel measurement reference signal is further provided according to another aspect of the present invention, comprising: a sending module, configured to send each port of the channel measurement reference signal in one subframe or two adjacent subframes during one sending period and send each port of the channel measurement reference signal repeatedly in full bandwidth with equal space in the unit of a predetermined composition unit.

In this case, the sending module can comprise: a first channel measurement reference signal port number setting unit, configured to newly design channel measurement reference signals with {1, 2, 4, 8} port(s), wherein the pattern of the channel measurement reference signal with 1 port and that of the first port of the channel measurement reference signals with 2 ports are the same, the pattern of the channel measurement reference signal with 2 ports and that of the first 2 ports of the channel measurement reference signal with 4 ports are the same, and the pattern of the channel measurement reference signal with 4 ports and that of the first 4 ports of the channel measurement reference signal with 8 ports are the same; and a second channel measurement reference signal port number setting unit, configured to newly design channel measurement reference signals with {4, 8} ports, when the number of actual antenna ports is equal to 4 or 8, the newly designed channel measurement reference signal with 4 or 8 ports achieves the downstream channel measurement of the long-term evolution advance system, and when the number of actual antenna ports is equal to 1 or 2, the common reference signal of the LTE system is reused by the channel measurement reference signal as a channel measurement reference signal, so as to achieve the downstream channel measurement of the long-term evolution advance system, wherein the pattern of the channel measurement reference signal with 4 ports and that of the first 4 ports of the channel measurement reference signal with 8 ports are the same.

In the present invention, the patterns of the channel measurement reference signals during different sending periods are the same, and the channel measurement reference signal is sent on the $6^{th}$, $9^{th}$, and $14^{th}$ symbols of the configured subframe, and the channel measurement reference signal is sent by taking a subframe of any number of 0, 2, 5, 10 or 20 as a period, and the frequency domain space of the equal space that the channel measurement reference signal predetermined composition unit is repeated with is {6, 8, 12, 16, 24, 30, 36, 42, 48}.

In addition, the system for sending a channel measurement reference signal according to the present invention further comprises: a repeated sending unit, configured to repeatedly send the channel measurement reference signal and the newly designed channel measurement reference signals in full bandwidth with equal space by taking one or two RBs as the predetermined composition unit, and the channel measurement reference signal with 8 ports is located on the $14^{th}$ OFDM symbol of the sending subframe.

It should be understood that the present invention can also space the predetermined composition unit by two RBs, or 1.5 RBs, or 2.5 RBs, or 3 RBs to sent it in full bandwidth with equal space.

Accordingly, by virtue of the present invention, the CRS sending of the LTE system is retained, the effect to the LTE users is very little, and the reference signal information required by high stage MIMO and COMP is provided, which is advantageous for the LTE-Advanced users to improve single link quality. In addition, since more sparse design is used, the performance degradation of LTE users is reduced, the design costs less, the performance of channel measurement can be ensured, and the LTE-A system throughput can be improved.

BRIEF DESCRIPTION OF THE ACCOMPANYING DRAWINGS

The drawings illustrated here provide a further understanding of the present invention and form a part of the present application. The exemplary embodiments and the description thereof are used to explain the present invention without unduly limiting the scope of the present invention. In the drawings.

DETAILED DESCRIPTION OF THE EMBODIMENTS

Figure 1:
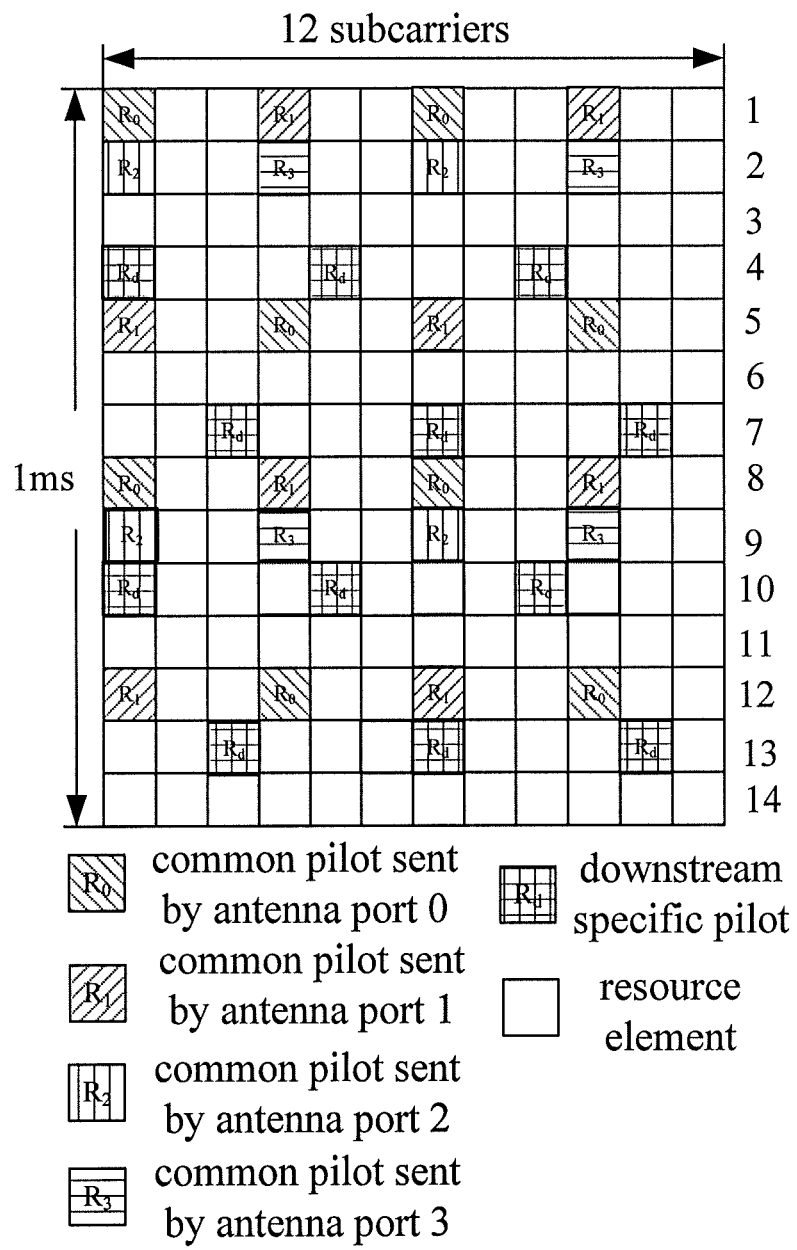
FIG. 1 shows the pattern of a common reference signal and a downstream specific reference signal of a normal cyclic prefix frame structure in the LTE standard.

The present invention now will be further described in conjunction with drawings and particular embodiments in the following.

The present invention proposes a method for sending a channel measurement reference signal of the LTE-A system. The particular disclosure of the present invention is to send the CSI-RSs of all the antenna ports on a PDSCH corresponding resource of one subframe or two subframes.

Since the CSI-RS needs to provide reference information about resource allocation for the LTE-A system, it is sent on the shared resources of a cell in full bandwidth for providing comprehensive schedule information on LTE and LTE-Advanced user shared resources.

In addition, the CSI-RS can use any number of antenna ports in the $\{0, 4, 8\}$ set. For example, the CSI-RS of one cell can use 0 port (i.e. not send CSI-RS), or CSI-RS with 4 ports, or CSI-RS with 8 ports or CSI-RS with four ports. The correlation between it and common reference signal and actual antenna port are as shown in the following table:

|  | Number of antenna ports = 1 | Number of antenna ports = 2 | Number of antenna ports = 4 | Number of antenna ports = 8 |
|---|---|---|---|---|
| Number of antenna ports of CRS = 1 | 1 Rel-8 CRS |  |  |  |
| Number of antenna ports of CRS = 2 |  | 2 Rel-8 CRS | 4 Rel-8 CSIRS | 8 Rel-10 CSIRS |
| Number of antenna ports of CRS = 4 |  |  | 4 Rel-8 CSIRS | 8 Rel-10 CSIRS |

In this case, when the number of CRS antenna ports is less than the number of actual antenna ports, Rel 8 may have used virtual antenna technology, while the users of Rel 10 does not use virtual antenna technology, then CRS cannot be used by CSI-RS. When the number of CRS antenna ports is equal to the number of actual antenna ports, then CRS can be used as CSI-RS.

The same kind of CSI-RS pattern is used in one subframe, a certain kind of CSI-RS pattern defined in the standard cannot switch between different frequency domains or different timeslots. The period of the CSI-RS time domain is N subframes, N∈$\{0, 2, 5, 10, 20\}$, and they are sent with equal space according to this period during a time period. The sending period of CSI-RS of different cells can be different.

It should be noted that when N=0, each subframe sends CSI-RS.

Each user receives the CSI-RS of its own cell, in order to support the channel measurement required by COMP, and COMP users can also receive the CSI-RS of other cells.

The method for sending a channel measurement reference signal according to the present invention, in which each port of channel measurement reference signals is sent using one subframe or two adjacent subframes during one sending period and each port of channel measurement reference signal is sent repeatedly in full bandwidth with equal space in the unit of a predetermined composition unit.

In this case, channel measurement reference signals with $\{1, 2, 4, 8\}$ port(s) are newly designed, in which the pattern of the channel measurement reference signal with 1 port and that of the first port of the channel measurement reference signal with 2 ports are the same, the pattern of the channel measurement reference signal with 2 ports and that of the first 2 ports of the channel measurement reference signal with 4 ports are the same, and the frequency domain space of the equal space that the channel measurement reference signal predetermined composition unit is repeated with is $\{6, 8, 12, 16, 24, 30, 36, 42, 48\}$.

The newly designed channel measurement reference signals are sent repeatedly in full bandwidth with equal space by taking one RB as the predetermined composition unit, and the channel measurement reference signal with 8 ports is located on the 14$^{th}$ OFDM symbol of the sending subframe, wherein the 0-port and 1-port of the channel measurement reference signal are mapped on the 15$^{th}$ and 2$^{nd}$ subcarriers adjacently, the 2-port and 3-port of the channel measurement reference signal are mapped on the 4$^{th}$ and 5$^{th}$ subcarriers adjacently, the 4-port and 5-port of the channel measurement reference signal are mapped on the $7^{th}$ and $8^{th}$ subcarriers adjacently, and the 6-port and 7-port of the channel measurement reference signal are mapped on the $10^{th}$ and $11^{th}$ subcarriers adjacently.

Furthermore, the newly designed channel measurement reference signals are sent repeatedly in full bandwidth with equal space by taking two RBs as the predetermined composition unit, and the channel measurement reference signal with 8 ports is located on the $14^{th}$ OFDM symbol of the sending subframe, wherein the 0-port of the channel measurement reference signal is mapped on the $1^{st}$, $9^{th}$, and $17^{th}$ subcarriers, the 1-port of the channel measurement reference signal is mapped on the $2^{nd}$, $10^{th}$, and $18^{th}$ subcarriers, the 2-port of the channel measurement reference signal is mapped on the $3^{rd}$, $11^{th}$, and $19^{th}$ subcarriers, the 3-port of the channel measurement reference signal is mapped on the $4^{th}$, $12^{th}$, and $20^{th}$ subcarriers, the 4-port of the channel measurement reference signal is mapped on the $5^{th}$, $13^{th}$, and $21^{st}$ subcarriers, the 5-port of the channel measurement reference signal is mapped on the $6^{th}$, $14^{th}$, and $22^{nd}$ subcarriers, the 6-port of the channel measurement reference signal is mapped on the $7^{th}$, $15^{th}$, and $23^{rd}$ subcarriers, and the 7-port of the channel measurement reference signal is mapped on the $8^{th}$, $16^{th}$, and $24^{th}$ subcarriers.

Furthermore, the newly designed channel measurement reference signals are sent repeatedly in full bandwidth with equal space by taking one RB as the predetermined composition unit, and the channel measurement reference signal with 8 ports is located on the $11^{th}$ and $14^{th}$ OFDM symbols of the sending subframe, wherein on the $11^{th}$ symbol, the 0-port and 1-port of the channel measurement reference signal are mapped on the $1^{st}$ and $2^{nd}$ subcarriers adjacently, the 2-port and 3-port of the channel measurement reference signal are mapped on the $4^{th}$ and $5^{th}$ subcarriers adjacently, the 4-port and 5-port of the channel measurement reference signal are mapped on the $7^{th}$ and $8^{th}$ subcarriers adjacently, and the 6-port and 7-port of the channel measurement reference signal are mapped on the $10^{th}$ and $11^{th}$ subcarriers adjacently; and on the $14^{th}$ OFDN symbol, the 0-port and 1-port of the channel measurement reference signal are mapped on the $7^{th}$ and $8^{th}$ subcarriers of the $14^{th}$ symbol adjacently, the 2-port and 3-port of the channel measurement reference signal are mapped on the $10^{th}$ and $11^{th}$ subcarriers of the $14^{th}$ symbol adjacently, the 4-port and 5-port of the channel measurement reference signal are mapped on the $1^{st}$ and $2^{nd}$ subcarriers of the $14^{th}$ symbol adjacently, and the 6-port and 7-port of the channel measurement reference signal are mapped on the $4^{th}$ and $5^{th}$ subcarriers of the $14^{th}$ symbol adjacently.

Furthermore, the newly designed channel measurement reference signals are sent repeatedly in full bandwidth with equal space by taking two RBs as the predetermined composition unit, and the channel measurement reference signal with 8 ports is located on the $14^{th}$ OFDM symbol of the sending subframe, wherein the 0-port of the channel measurement reference signal is mapped on the $3^{rd}$ subcarrier, the 1-port of the channel measurement reference signal is mapped on the $6^{th}$ subcarrier, the 2-port of the channel measurement reference signal is mapped on the $9^{th}$ subcarrier, the 3-port of the channel measurement reference signal is mapped on the $12^{th}$ subcarrier, the 4-port of the channel measurement reference signal is mapped on the $15^{th}$ subcarrier, the 5-port of the channel measurement reference signal is mapped on the $18^{th}$ subcarrier, the 6-port of the channel measurement reference signal is mapped on the $21^{st}$ subcarrier, and the 7-port of the channel measurement reference signal is mapped on the $24^{th}$ subcarrier.

Furthermore, the newly designed channel measurement reference signals are sent repeatedly in full bandwidth with equal space by taking one RB as the predetermined composition unit, and the channel measurement reference signal with 8 ports is located on the $6^{th}$ and $11^{th}$ OFDM symbols of the sending subframe, wherein the 0-port and 4-port of the channel measurement reference signal are mapped on the $1^{st}$ subcarrier, the 1-port and 5-port of the channel measurement reference signal are mapped on the $4^{th}$ subcarrier, the 2-port and 6-port of the channel measurement reference signal are mapped on the $7^{th}$ subcarrier, and the 3-port and 7-port of the channel measurement reference signal are mapped on the $10^{th}$ subcarrier.

In addition, the channel measurement reference signals are sent repeatedly in full bandwidth with equal space by taking one RB as the predetermined composition unit, and the channel measurement reference signal with 8 ports is located on the $6^{th}$ OFDM symbol of the sending subframe, wherein the 0-port and 1-port of the channel measurement reference signal are mapped on the $1^{st}$ and $2^{nd}$ subcarriers adjacently, the 2-port and 3-port of the channel measurement reference signal are mapped on the $7^{th}$ and $8^{th}$ subcarriers adjacently, and the frequency domain locations of the 4-port, 5-port, 6-port, and 7-port of the channel measurement reference signal are the same as those of the 0-port, 1-port, 2-port, and 3-port of the channel measurement reference signal respectively, and each port of the channel measurement reference signal is the same when being configured at different antenna ports and at the same time the mapping of the channel measurement reference signals with 1, 2, 4, and 8 port(s) are supported.

Furthermore, the channel measurement reference signals are sent repeatedly in full bandwidth with equal space by taking one RB as the predetermined composition unit, wherein the channel measurement reference signal with 8 ports is located on the $6^{th}$ and $11^{th}$ OFDM symbols of the sending subframe, the 0-port of CSI-RS is mapped on the $1^{st}$ subcarrier of the $6^{th}$ OFDM symbol, the 1-port of CSI-RS is mapped on the $4^{th}$ subcarrier of the $6^{th}$ OFDM symbol, the 2-port of CSI-RS is mapped on the $7^{th}$ subcarrier of the $6^{th}$ OFDM symbol, the 3-port of CSI-RS is mapped on the $10^{th}$ subcarrier of the $6^{th}$ OFDM symbol; the 4-port of CSI-RS is mapped on the $1^{st}$ subcarrier of the $11^{th}$ OFDM symbol, the 5-port of CSI-RS is mapped on the $4^{th}$ subcarrier of the $11^{th}$ OFDM symbol, the 6-port of CSI-RS is mapped on the $7^{th}$ subcarrier of the $11^{th}$ OFDM symbol, and the 7-port of CSI-RS is mapped on the $10^{th}$ subcarrier of the $11^{th}$ OFDM symbol.

Furthermore, the channel measurement reference signals are sent repeatedly in full bandwidth with equal space by taking one RB as the predetermined composition unit, wherein the channel measurement reference signal with 8 ports is located on the $6^{th}$ and $11^{th}$ OFDM symbols of the sending subframe, the 0-port and 1-port of CSI-RS are mapped on the $1^{st}$ and $2^{nd}$ subcarriers of the $6^{th}$ OFDM symbol adjacently, the 2-port and 3-port of CSI-RS are mapped on the $7^{th}$ and $8^{th}$ subcarriers of the $6^{th}$ OFDM symbol adjacently, and the 4-port, 5-port, 6-port, and 7-port are mapped on the $11^{th}$ symbol, with the frequency domain locations thereof being the same as those of the 0-port, 1-port, 2-port, and 3-port respectively.

Furthermore, the channel measurement reference signals are sent repeatedly in full bandwidth with equal space by taking one RB as the predetermined composition unit, wherein the channel measurement reference signal with 8 ports is located on the $6^{th}$ and $14^{th}$ OFDM symbols of the sending subframe, the 0-port and 1-port of CSI-RS are mapped on the $1^{st}$ and $2^{nd}$ subcarriers of the $6^{th}$ OFDM symbol adjacently, the 2-port and 3-port of CSI-RS are mapped on the $7^{th}$ and $8^{th}$ subcarriers of the $6^{th}$ OFDM symbol adjacently, and the 4-port, 5-port, 6-port, and 7-port are mapped on the 14$^{th}$ symbol, with the frequency domain locations thereof being the same as those of the 0-port, 1-port, 2-port, and 3-port respectively.

FIG. 1 shows the pattern of a common reference signal and a downstream specific reference signal of a normal cyclic prefix frame structure according to the LTE standard, and when mapping the channel measurement reference signal, these locations should be avoid, and FIGS. 2 to 10 are channel measurement reference signal patterns according to the embodiments of the present invention. The technical solution of the present invention now will be described in the manner of particular embodiments in conjunction with drawings hereinafter.

Embodiment I

When the number of actual antenna ports is equal to 4 or 8, the newly designed channel measurement reference signal with 4 or 8 ports achieves the downstream channel measurement of the LTE-A system; and when the number of actual antenna ports is equal to 1 or 2, the channel measurement reference signal reuses the common reference signal of the LTE-A system as a channel measurement reference signal to achieve the downstream channel measurement of the LTE-A system. The pattern of the CSI-RS with 4 ports and that of the first 4 ports of the CSI-RS with 8 ports are the same.

Figure 2:
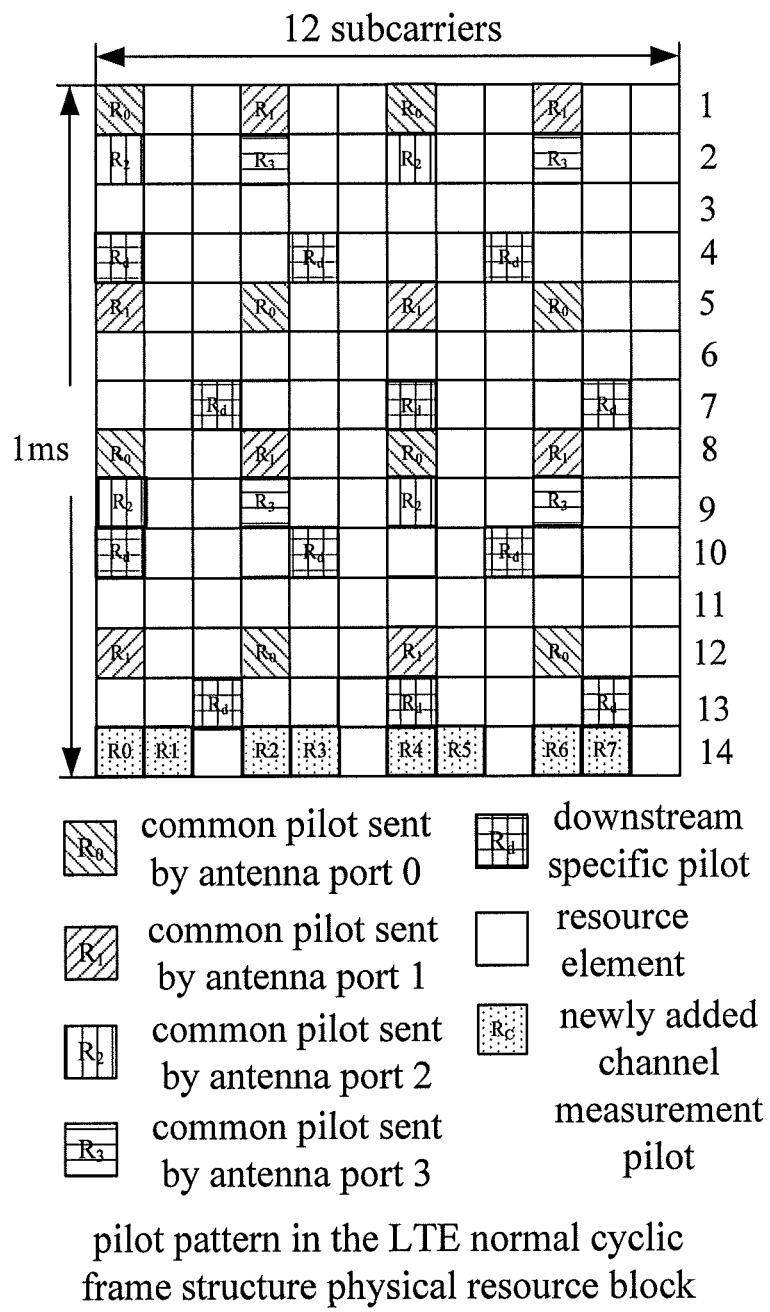
FIG. 2 shows a channel measurement reference signal pattern according to the first embodiment of the present invention.

The newly designed CSI-RS sends the pattern shown in FIG. 2 repeatedly with a certain period, and the newly designed CSI-RS within each period takes up one subframe to send.

The reference signal frequency domain space of each port of antenna ports of the newly designed CSI-RS is 12 subcarriers, and each RB of the full bandwidth of the CSI-RS sending subframe repeats the pattern shown in FIG. 2.

The newly designed CSI-RS is mapped on the 14$^{th}$ symbol of each subframe to send.

The 0-port and 1-port of CSI-RS are mapped on the 1$^{st}$ and 2$^{nd}$ subcarriers adjacently, the 2-port and 3-port of CSI-RS are mapped on the 4$^{th}$ and 5$^{th}$ subcarriers adjacently, the 4-port and 5-port of CSI-RS are mapped on the 7$^{th}$ and 8$^{th}$ subcarriers adjacently, and the 6-port and 7-port of CSI-RS are mapped on the 10$^{th}$ and 11$^{th}$ subcarriers adjacently.

Embodiment II

When the number of actual antenna ports is equal to 4 or 8, the newly designed channel measurement reference signal with 4 or 8 ports achieves downstream channel measurement of the LTE-A system; and when the number of actual antenna ports is equal to 1 or 2, the channel measurement reference signal reuses the common reference signal of the LTE-A system as a channel measurement reference signal to achieve the downstream channel measurement of the LTE-A system. The pattern of the CSI-RS with 4 ports and that of the first 4 ports of the CSI-RS with 8 ports are the same.

Figure 3:
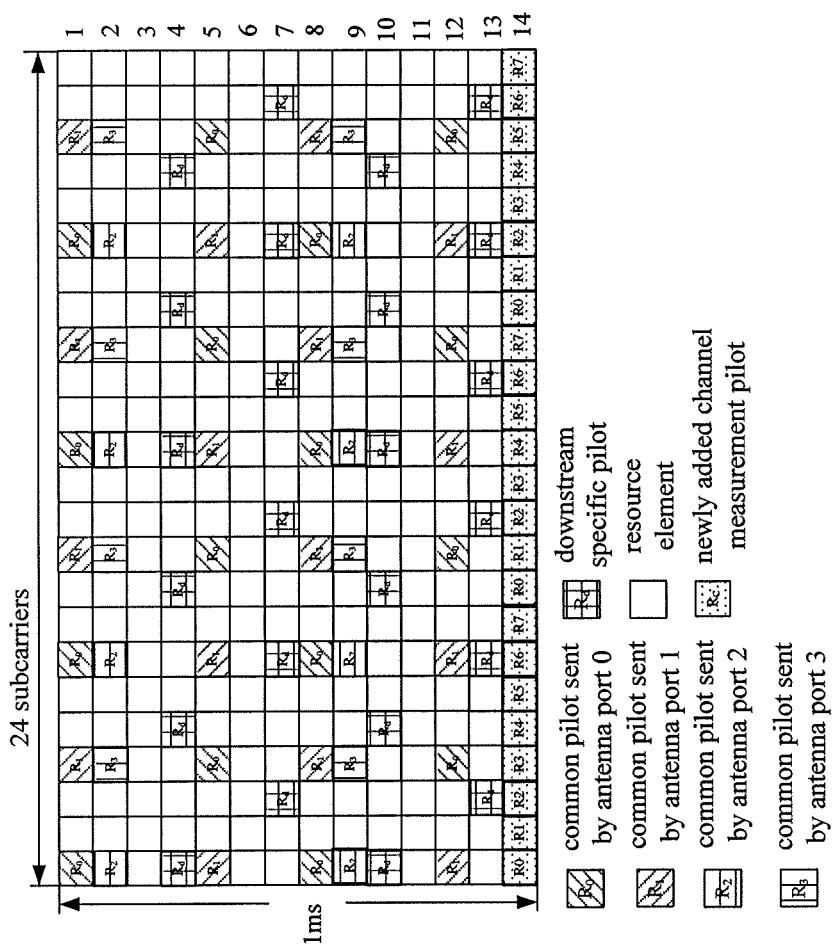
FIG. 3 shows a channel measurement reference signal pattern according to the second embodiment of the present invention.

The newly designed CSI-RS with 4 or 8 ports sends the pattern shown in FIG. 3 repeatedly with a certain period, and the newly designed CSI-RS within each period takes up one subframe to send.

The reference signal frequency domain space of each port of antenna ports of the newly designed CSI-RS is 8 subcarriers, and each two RBs of the full bandwidth of the CSI-RS sending subframe repeats the pattern shown in FIG. 3.

The newly designed CSI-RS is mapped on the 14$^{th}$ symbol of each subframe to send.

The 0 port of CSI-RS is mapped on the 1$^{st}$, 9$^{th}$, and 17$^{th}$ subcarriers, the 1-port of CSI-RS is mapped on the 2$^{nd}$, 10$^{th}$, and 18$^{th}$ subcarriers, the 2-port of CSI-RS is mapped on the 3$^{rd}$, 11$^{th}$, and 19$^{th}$ subcarriers, the 3-port of CSI-RS is mapped on the 4$^{th}$, 12$^{th}$, and 20$^{th}$ subcarriers, the 4-port of CSI-RS is mapped on the 5$^{th}$, 13$^{th}$, and 21$^{st}$ subcarriers, the 5-port of CSI-RS is mapped on the 6$^{th}$, 14$^{th}$, and 22$^{nd}$ subcarriers, the 6-port of CSI-RS is mapped on the 7$^{th}$, 15$^{th}$, and 23$^{rd}$ subcarriers, and the 7-port of CSI-RS is mapped on the 8$^{th}$, 16$^{th}$, and 24$^{th}$ subcarriers.

Embodiment III

When the number of actual antenna ports is equal to 4 or 8, the newly designed channel measurement reference signal with 4 or 8 ports achieves the downstream channel measurement of the LTE-A system; and when the number of actual antenna ports is equal to 1 or 2, the channel measurement reference signal reuses the common reference signal of the LTE-A system as a channel measurement reference signal to achieve the downstream channel measurement of the LTE-A system. The pattern of the CSI-RS with 4 ports and that of the first 4 ports of the CSI-RS with 8 ports are the same.

Figure 4:
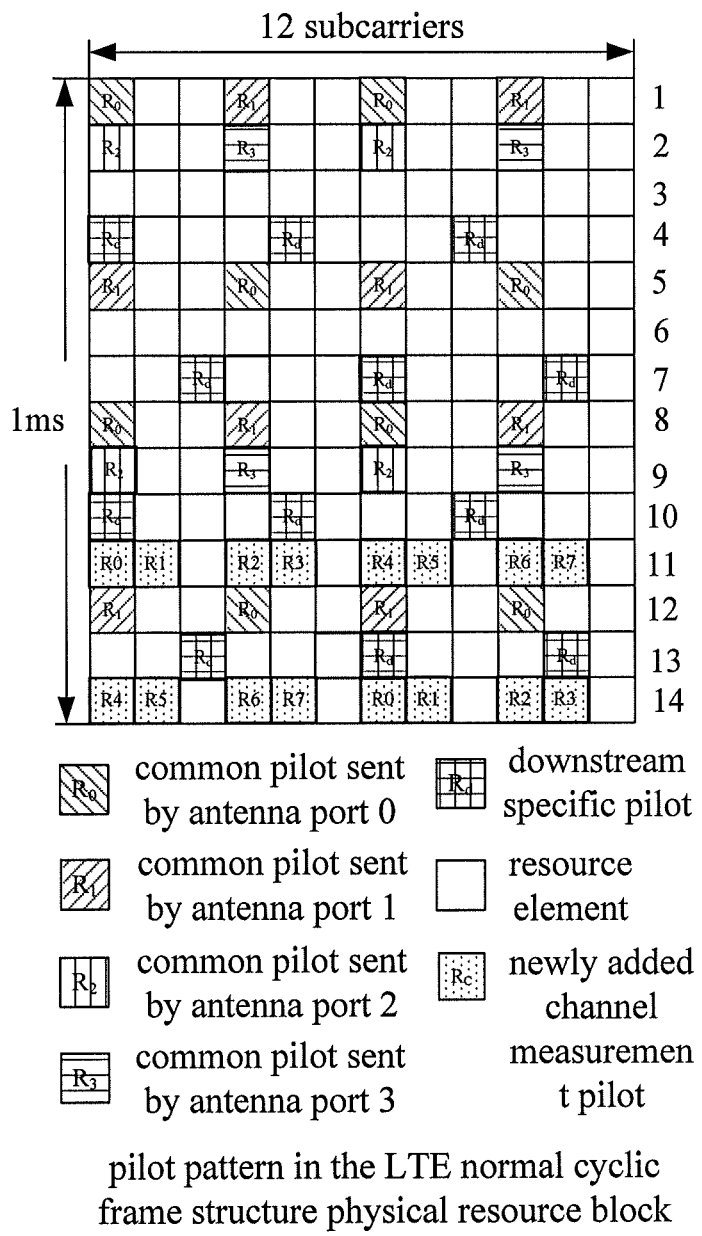
FIG. 4 shows a channel measurement reference signal pattern according to the third embodiment of the present invention.

The newly designed CSI-RS with 4 or 8 ports sends the pattern shown in FIG. 4 repeatedly with a certain period, and the newly designed CSI-RS within each period takes up one subframe to send.

The reference signal frequency domain space of each port of antenna ports of the newly designed CSI-RS is 6 subcarriers, and each RB of the full bandwidth of the CSI-RS sending subframe repeats the pattern shown in FIG. 4.

The newly designed CSI-RS is mapped on the 11$^{th}$ and 14$^{th}$ symbols of each subframe to send.

The 0-port and 1-port of CSI-RS are mapped on the 1$^{st}$ and 2$^{nd}$ subcarriers of the 11$^{th}$ symbol adjacently, the 2-port and 3-port of CSI-RS are mapped on the 4$^{th}$ and 5$^{th}$ subcarriers of the 11$^{th}$ symbol adjacently, the 4-port and 5-port of CSI-RS are mapped on the 7$^{th}$ and 8$^{th}$ subcarriers of the 11$^{th}$ symbol adjacently, the 6-port and 7-port of CSI-RS are mapped on the 10$^{th}$ and 11$^{th}$ subcarriers of the 11$^{th}$ symbol adjacently; or the 0-port and 1-port of CSI-RS are mapped on the 7$^{th}$ and 8$^{th}$ subcarriers of the 14$^{th}$ symbol adjacently, the 2-port and 3-port of CSI-RS are mapped on the 10$^{th}$ and 11$^{th}$ subcarriers of the 14$^{th}$ symbol adjacently, the 4-port and 5-port of CSI-RS are mapped on the 1$^{st}$ and 2$^{nd}$ subcarriers of the 14$^{th}$ symbol adjacently, and the 6-port and 7-port of CSI-RS are mapped on the 4$^{th}$ and 5$^{th}$ subcarriers of the 14$^{th}$ symbol adjacently.

Embodiment IV

When the number of actual antenna ports is equal to 4 or 8, the newly designed channel measurement reference signal with 4 or 8 ports achieves the downstream channel measurement of the LTE-A system; and when the number of actual antenna ports is equal to 1 or 2, the channel measurement reference signal reuses the common reference signal of the LTE-A system as a channel measurement reference signal to achieve the downstream channel measurement of the LTE-A system. The pattern of the CSI-RS with 4 ports and that of the first 4 ports of the CSI-RS with 8 ports are the same.

Figure 5:
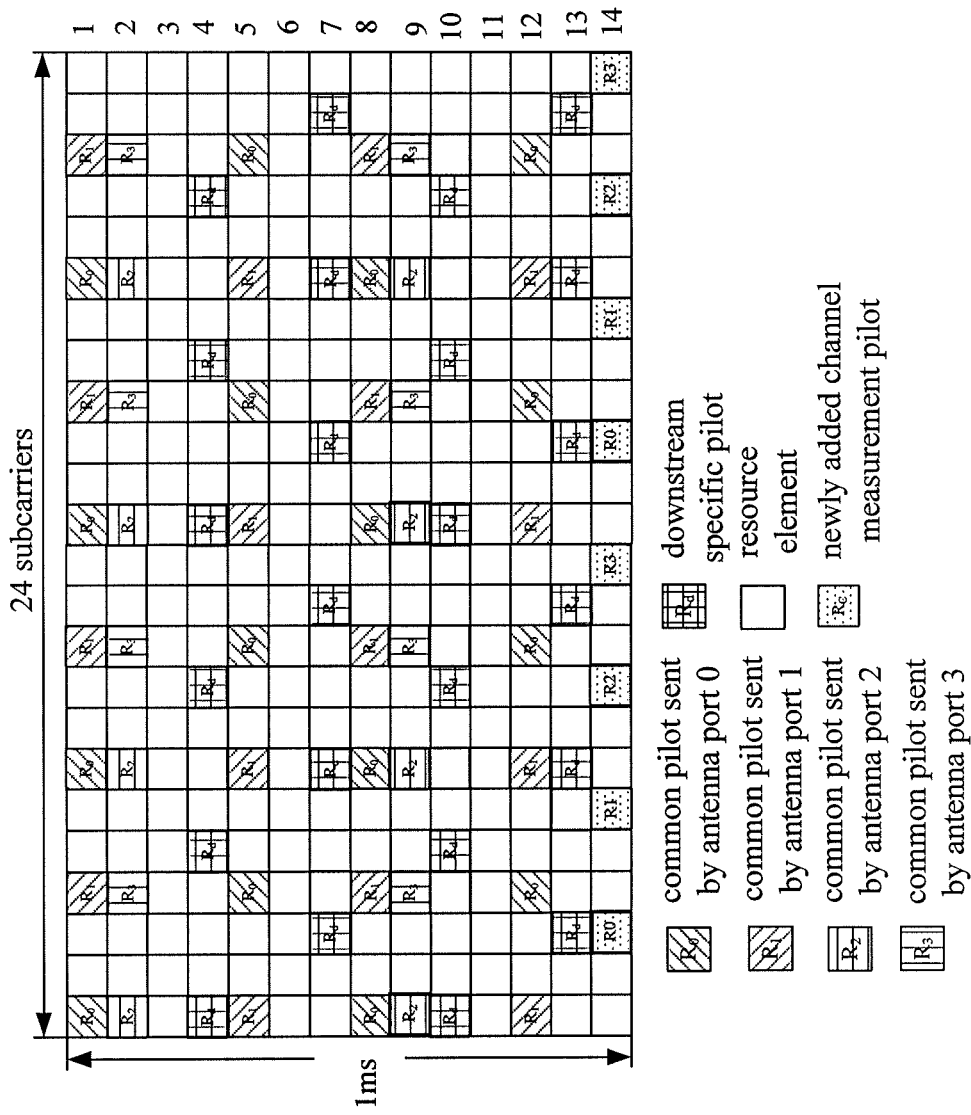
FIG. 5 shows a channel measurement reference signal pattern according to the fourth embodiment of the present invention.

The newly designed CSI-RS with 4 or 8 ports sends the pattern shown in FIG. 5 repeatedly with a certain period, and the newly designed CSI-RS within each period takes up one subframe to send.

The reference signal frequency domain space of each port of antenna ports of the newly designed CSI-RS is 24 subcarriers, and each two RBs of the full bandwidth of the CSI-RS sending subframe repeats the pattern shown in FIG. 5.

The newly designed CSI-RS is mapped on the $14^{th}$ symbol of each subframe to send.

The 0 port of CSI-RS is mapped on the $3^{rd}$ subcarrier, the 1-port of CSI-RS is mapped on the $6^{th}$ subcarrier, the 2-port of CSI-RS is mapped on the $9^{th}$ subcarrier, the 3-port of CSI-RS is mapped on the $12^{th}$ subcarrier, the 4-port of CSI-RS is mapped on the $15^{th}$ subcarrier, the 5-port of CSI-RS is mapped on the $18^{th}$ subcarrier, the 6-port of CSI-RS is mapped on the $21^{th}$ subcarrier, and the 7-port of CSI-RS is mapped on the $24^{th}$ subcarrier.

Embodiment V

When the number of actual antenna ports is equal to 4 or 8, the newly designed channel measurement reference signal with 4 or 8 ports achieves the downstream channel measurement of the LTE-A system; and when the number of actual antenna ports is equal to 1 or 2, the channel measurement reference signal reuses the common reference signal of the LTE-A system as a channel measurement reference signal to achieve the downstream channel measurement of the LTE-A system. The pattern of CSI-RS with 4 ports and that of the first 4 ports of the CSI-RS with 8 ports are the same.

Figure 6:
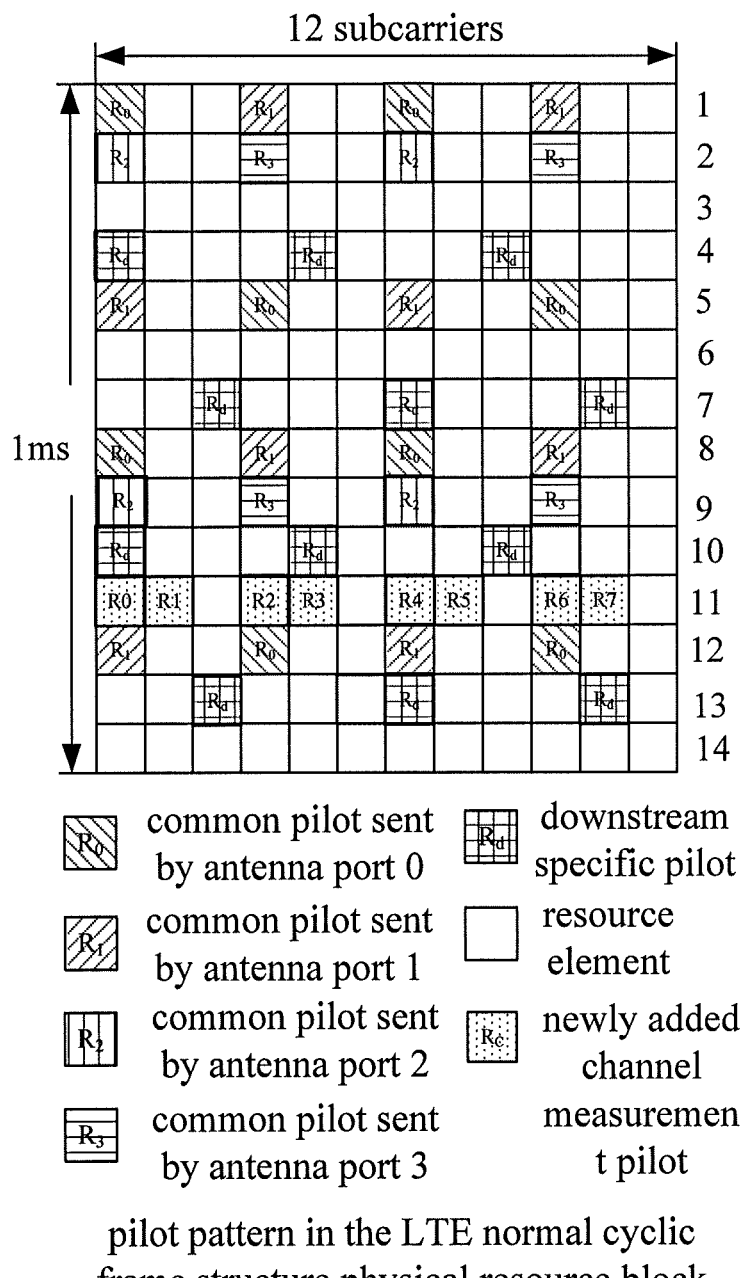
FIG. 6 shows a channel measurement reference signal pattern according to the fifth embodiment of the present invention.

The newly designed CSI-RS with 4 or 8 ports sends the pattern shown in FIG. 6 repeatedly with a certain period, and the newly designed CSI-RS within each period takes up one subframe to send.

The reference signal frequency domain space of each port of antenna ports of the newly designed CSI-RS is 12 subcarriers, and each RB of the full bandwidth of the CSI-RS sending subframe repeats the pattern shown in FIG. 6.

The newly designed CSI-RS is mapped on the $11^{th}$ symbol of each subframe to send.

The 0-port and 1-port of CSI-RS are mapped on the $1^{st}$ and $2^{nd}$ subcarriers adjacently, the 2-port and 3-port of CSI-RS are mapped on the $4^{th}$ and $5^{th}$ subcarriers adjacently, the 4-port and 5-port of CSI-RS are mapped on the $7^{th}$ and $8^{th}$ subcarriers adjacently, the and 6-port and 7-port of CSI-RS are mapped on the $10^{th}$ and $11^{th}$ subcarriers adjacently.

Embodiment VI

CSI-RSs with {1, 2, 4, 8} port(s) are newly designed, the patterns of the CSI-RS with 4 ports and that of the first 4 ports of the CSI-RS with 8 ports are the same. The pattern of the CSI-RS with 1 port and that of the first port of the CSI-RS with 2 ports are the same, the pattern of the CSI-RS with 2 ports and that of the first 2 ports of the CSI-RS with 4 ports are the same, and the pattern of the CSI-RS with 4 ports and that of the first 4 ports of the CSI-RS 8 ports are the same.

Figure 7:
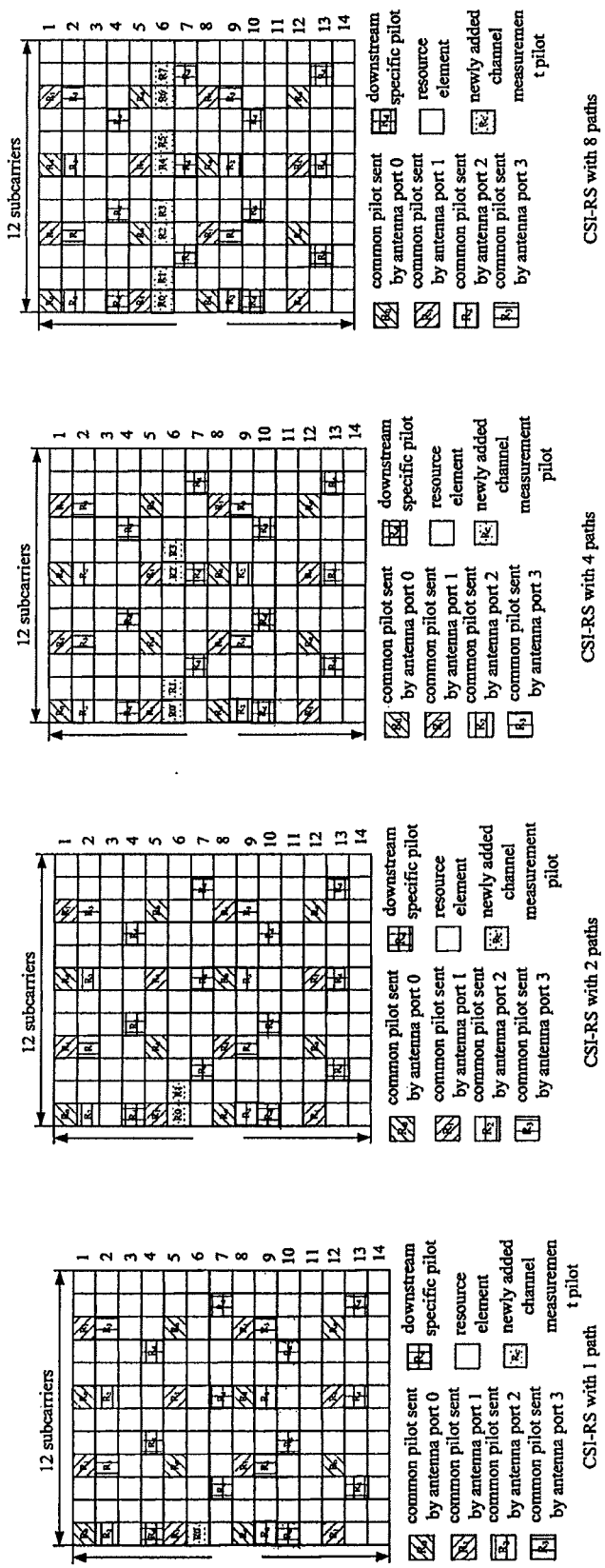
FIG. 7 shows a channel measurement reference signal pattern according to the sixth embodiment of the present invention.

The CSI-RS sends the pattern shown in FIG. 7 repeatedly with a certain period, and the newly designed CSI-RS within each period takes up one subframe to send.

The reference signal frequency domain space of each port of antenna ports of the newly designed CSI-RS is 12 subcarriers, and each RB of the full bandwidth of the CSI-RS sending subframe repeats the pattern shown in FIG. 7. The newly designed CSI-RS is mapped on the $6^{th}$ symbol of each subframe to send.

The 0-port and 1-port of CSI-RS are mapped on the $1^{st}$ and $2^{nd}$ subcarriers adjacently, the 2-port and 3-port of CSI-RS are mapped on the $4^{th}$ and $5^{th}$ subcarriers adjacently, the 4-port and 5-port of CSI-RS are mapped on the $7^{th}$ and $8^{th}$ subcarriers adjacently, and the 6-port and 7-port of CSI-RS are mapped on the $10^{th}$ and $11^{th}$ subcarriers adjacently.

Embodiment VII

When the number of actual antenna ports is equal to 4 or 8, the newly designed channel measurement reference signal with 4 or 8 ports achieves the downstream channel measurement of the LTE-A system; and when the number of actual antenna ports is equal to 1 or 2, the channel measurement reference signal reuses the common reference signal of the LTE-A system as a channel measurement reference signal to achieve the downstream channel measurement of the LTE-A system. The pattern of the CSI-RS with 4 ports and that of the first 4 ports of the CSI-RS with 8 ports are the same.

Figure 8:
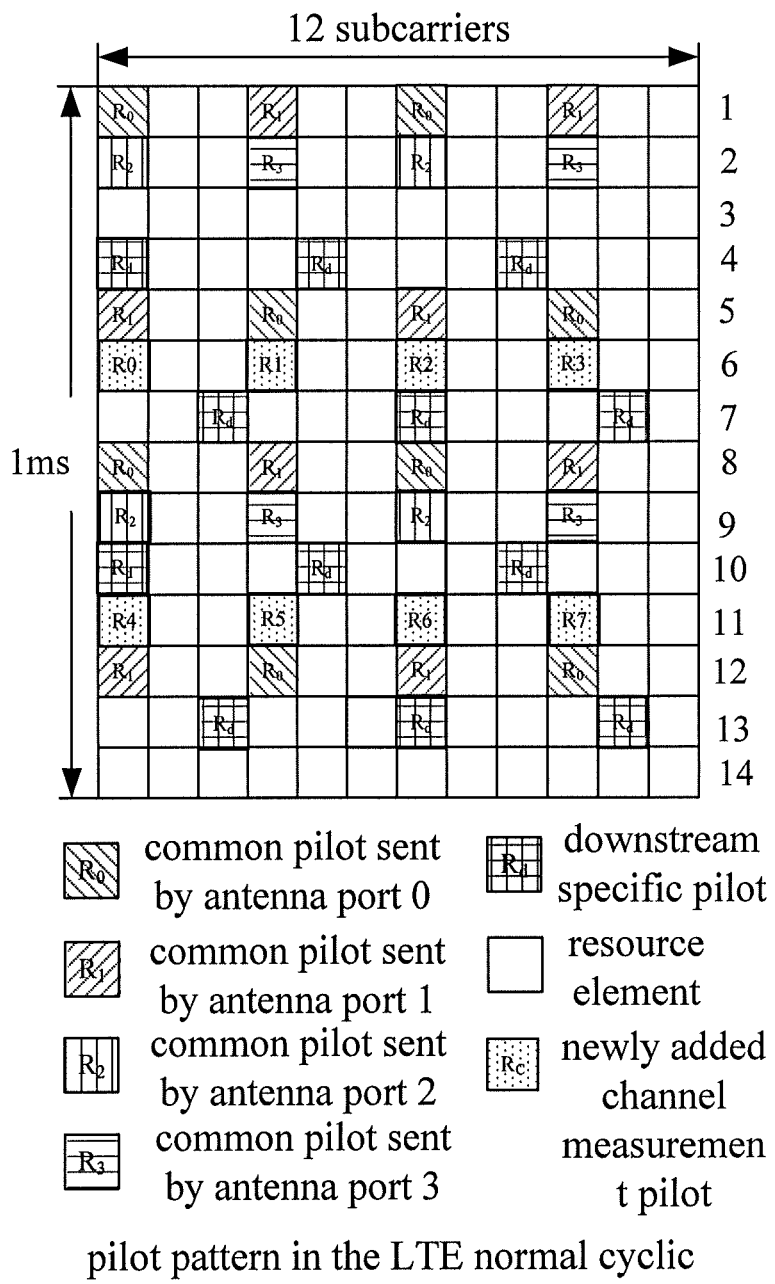
FIG. 8 shows a channel measurement reference signal pattern according to the seventh embodiment of the present invention.

The newly designed CSI-RS with 4 or 8 ports sends the pattern shown in FIG. 8 repeatedly with a certain period, and the newly designed CSI-RS within each period takes up one subframe to send.

The reference signal frequency domain space of each port of antenna ports of the newly designed CSI-RS is 12 subcarriers, and each RB of the full bandwidth of the CSI-RS sending subframe repeats the pattern shown in FIG. 8.

The 0-port to 3-port of the newly designed CSI-RS are mapped on the $6^{th}$ symbol of each subframe to send; and the 4-port to 7-port are mapped on the $11^{th}$ symbol of each subframe to send.

The 0-port and 4-port of CSI-RS are mapped on the $1^{st}$ subcarrier, the 1-port and 5-port of CSI-RS are mapped on the $4^{th}$ subcarrier, the 2-port and 6-port of CSI-RS are mapped on the $7^{th}$ subcarrier, and the 3-port and 7-port of CSI-RS are mapped on the $10^{th}$ subcarrier.

Embodiment VIII

When the number of actual antenna ports is equal to 4 or 8, the newly designed channel measurement reference signal with 4 or 8 ports achieves the downstream channel measurement of the LTE-A system; and when the number of actual antenna ports is equal to 1 or 2, the channel measurement reference signal reuses the common reference signal of the LTE-A system as a channel measurement reference signal to achieve the downstream channel measurement of the LTE-A system. The pattern of the CSI-RS with 4 ports and that of the first 4 ports of the CSI-RS with 8 port are the same.

Figure 9:
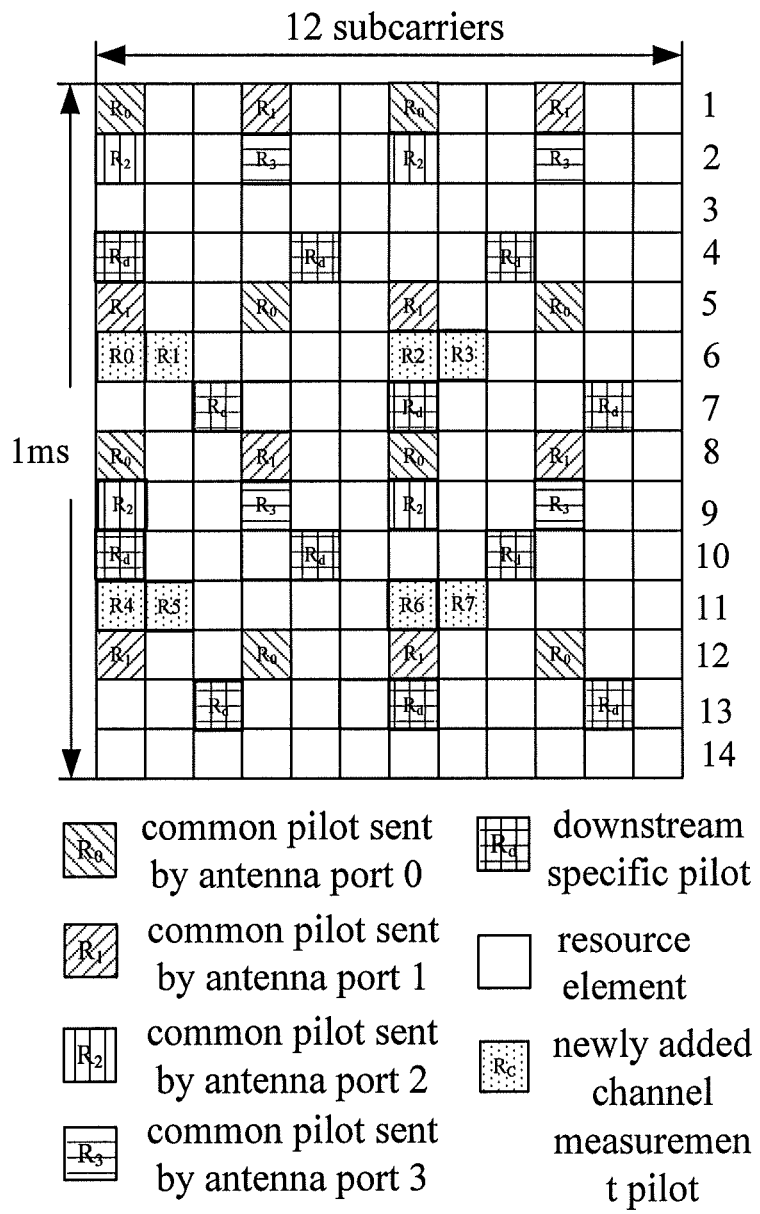
FIG. 9 shows a channel measurement reference signal pattern according to the eighth embodiment of the present invention.

The newly designed CSI-RS with 4 or 8 port sends the pattern shown in FIG. 9 repeatedly with a certain period, and the newly designed CSI-RS within each period takes up one subframe to send.

The reference signal frequency domain space of each port of antenna ports of the newly designed CSI-RS is 12 subcarriers, and each RB of the full bandwidth of the CSI-RS sending subframe repeats the pattern shown in FIG. 9.

The 0-port to 3-port of the newly designed CSI-RS are mapped on the $6^{th}$ symbol of each subframe to send; and the 4-port to 7-port are mapped on the $11^{th}$ symbol of each subframe to send.

The 0-port and 1-port of CSI-RS are sent on the $1^{st}$ and $2^{nd}$ subcarriers adjacently, the 2-port and 3-port of CSI-RS are mapped on the $7^{th}$ and $8^{th}$ subcarriers adjacently, and the frequency domain locations of the 4-port, 5-port, 6-port, and 7-port are the same as those of the 0-port, 1-port, 2-port, and 3-port respectively.

Embodiment IX

When the number of actual antenna ports is equal to 4 or 8, the newly designed channel measurement reference signal with 4 or 8 ports achieves downstream channel measurement of the LTE-A system; and when the number of actual antenna ports is equal to 1 or 2, the channel measurement reference signal reuses the common reference signal of the LTE-A system as a channel measurement reference signal to achieve the downstream channel measurement of the LTE-A system. The pattern of the CSI-RS 4 ports and that of the first 4 ports of the CSI-RS with 8 ports are the same.

Figure 10:
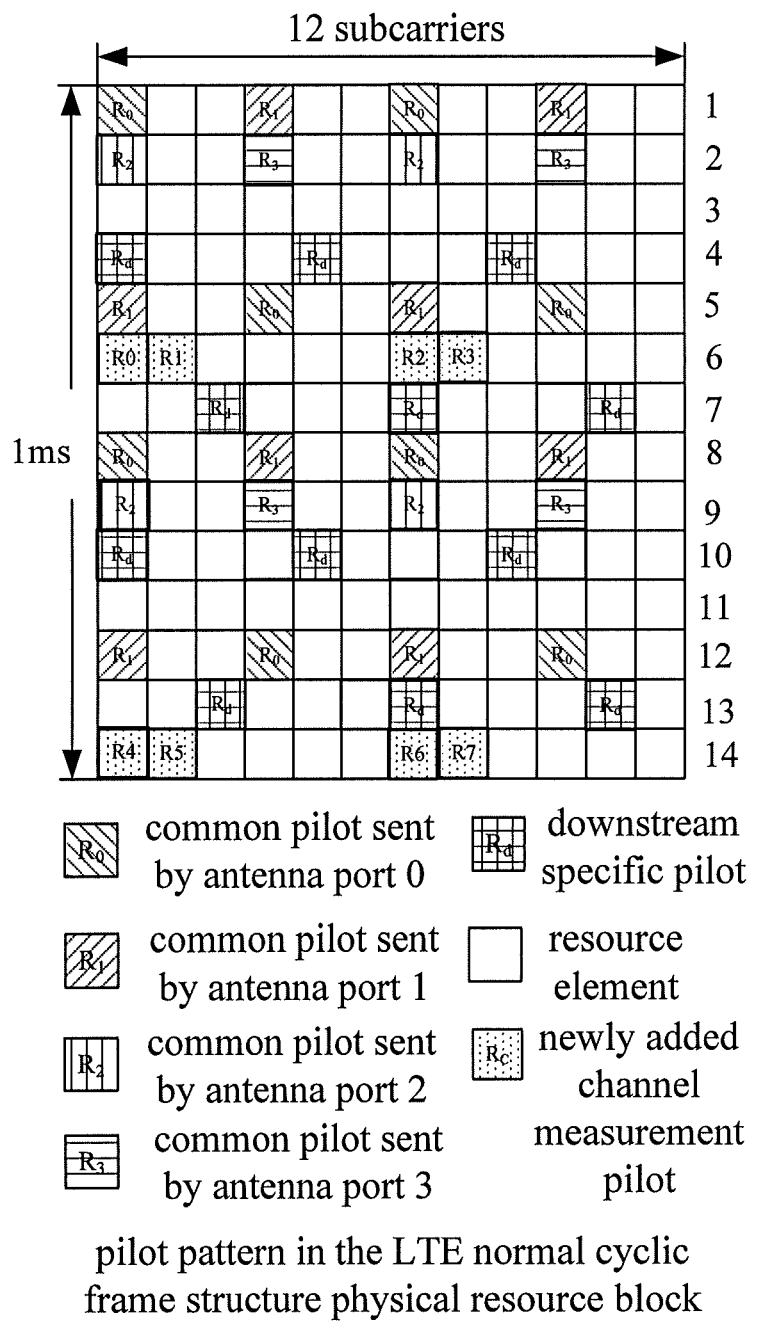
FIG. 10 shows a channel measurement reference signal pattern according to the ninth embodiment of the present invention.

The newly designed CSI-RS with 4 or 8 ports sends the pattern shown in FIG. 10 repeatedly with a certain period, and the newly designed CSI-RS within each period takes up one subframe to send.

The reference signal frequency domain space of each port of antenna ports of the newly designed CSI-RS is 12 subcarriers, and each RB of the full bandwidth of the CSI-RS sending subframe repeats the pattern shown in FIG. 10.

The 0-port to 3-port of the newly designed CSI-RS are mapped on the $6^{th}$ symbol of each subframe to send; and the 4-port to 7-port are mapped on the $14^{th}$ symbol of each subframe to send.

The 0-port and 1-port of CSI-RS are sent on the $1^{st}$ and $2^{nd}$ subcarriers adjacently, the 2-port and 3-port of CSI-RSs are mapped on the $7^{th}$ and $8^{th}$ subcarriers adjacently, and the frequency domain locations of the 4-port, 5-port, 6-port, and 7-port are the same as those of the 0-port, 1-port, 2-port, and 3-port respectively.

Figure 11:
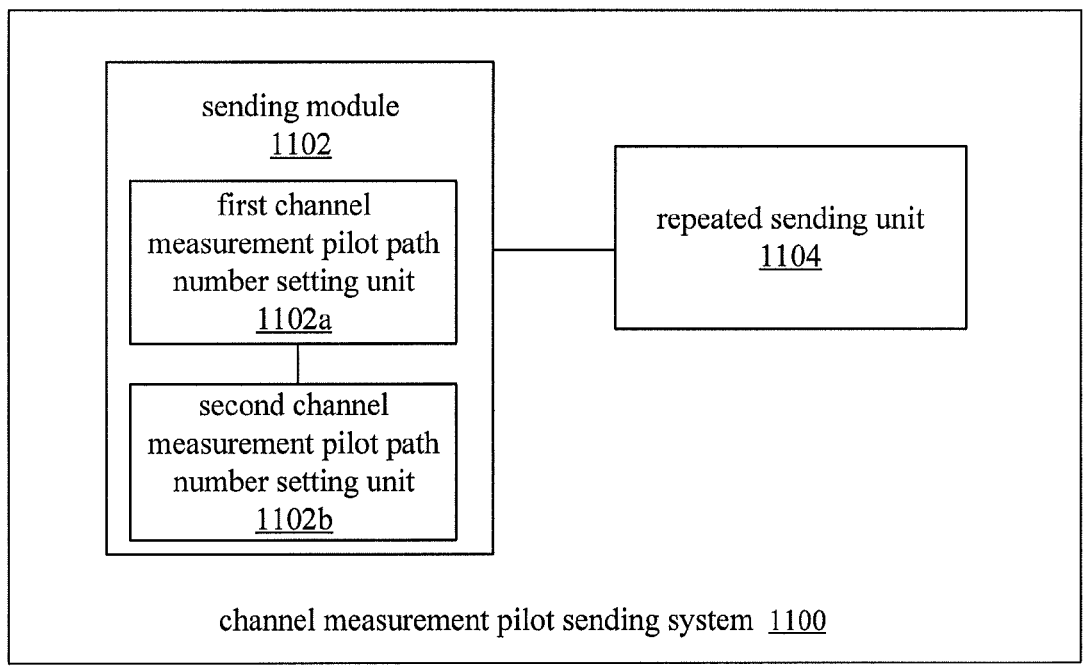
FIG. 11 is a block diagram of a system for sending a channel measurement reference signal according to the present invention.

FIG. 11 is a block diagram of a system 1100 for sending a channel measurement reference signal according to the present invention. As shown in FIG. 11, this system comprises: a sending module 1102, configured to send each port of the channel measurement reference signal in one subframe or two adjacent subframes during one sending period and send each port of the channel measurement reference signal repeatedly in full bandwidth with equal space in the unit of a predetermined composition unit.

In this case, the sending module 1102 can comprise: a first channel measurement reference signal port number setting unit 1102a, configured to newly design channel measurement reference signals with {1, 2, 4, 8} port(s), wherein the pattern of the channel measurement reference signal with 1 port and that of the first port of the channel measurement reference signal with 2 ports are the same, the pattern of the channel measurement reference signal with 2 ports and that of the first ports of the channel measurement reference signal with 4 ports are the same, and the pattern of the channel measurement reference signal with 4 ports and that of the first 4 ports of the channel measurement reference signal with 8 ports are the same; and a second channel measurement reference signal port number setting unit 1102b, configured to newly design channel measurement reference signals with {4, 8} ports, when the number of actual antenna ports is equal to 4 or 8, the newly designed channel measurement reference signal with 4 or 8 port achieves the downstream channel measurement of the long-term evolution advance system, and when the number of actual antenna ports is equal to 1 or 2, the common reference signal of the LTE system is reused as a channel measurement reference signals by the channel measurement reference signal, so as to achieve the downstream channel measurement of the long-term evolution advance system, wherein the pattern of the channel measurement reference signal with 4 ports and that of the first 4 ports of the channel measurement reference signal with 8 ports are the same.

In the present invention, the patterns of the channel measurement reference signals during different sending periods are the same, and the channel measurement reference signal is sent on the $6^{th}$, $9^{th}$, and $14^{th}$ symbols of the configured subframe, and the channel measurement reference signal is sent by taking a subframe of any number of 0, 2, 5, 10 or 20 as a period, and the frequency domain space of the equal space that the channel measurement reference signal predetermined composition unit is repeated with is {6, 8, 12, 16, 24, 30, 36, 42, 48}.

In addition, the system for sending a channel measurement reference signal according to the present invention can further comprise: a repeated sending unit 1104, configured to repeatedly send the channel measurement reference signal and the newly designed channel measurement reference signals in full bandwidth with equal space by taking one or two RBs as the predetermined composition unit, and the channel measurement reference signal with 8 ports is located on the $14^{th}$ OFDM symbol of the sending subframe.

Although the above present invention sends the predetermined composition unit by each RB, it should be understood that the present invention can further be applied in sending the predetermined composition unit in full bandwidth with equal space by spacing 2 RBs, or 1.5 RBs, or 2.5 RBs, or 3 RBs.

Those skilled in the art should understand that the above sending method of the present invention can be implemented through general-purpose computing devices and they can be put together on single computing device or distributed on a network consisted of a plurality of computing devices, optionally, they can be implemented using computing device executable program code, therefore, they can be executed by computing devices by storing them in a storage device, or they can be made into each integrated circuit module respectively or they can be implemented by making a plurality of modules or steps of them into single integrated module respectively. In this way, the present invention is not restricted to any particular hardware and software combination.

In summary, by virtue of the present invention, the CRS sending of the LTE system is retained, the effect to the LTE users is very little, and the reference signal information required by high stage MIMO and COMP is provided, which is advantageous for the LTE-Advanced users to improve single link quality. In addition, since more sparse design is used, the performance degradation of LTE users is reduced, the design costs less, the performance of channel measurement can be ensured, and the LTE-A system throughput can be improved.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

The invention claimed is:

1. A method for sending a channel measurement reference signal, comprising the following steps:
during one sending period, sending the channel measurement reference signal of each port by a base station in one subframe or two adjacent subframes and sending the channel measurement reference signal of each port repeatedly in full bandwidth with equal space by taking at least one resource block (RB) as the predetermined a predetermined composition unit; wherein newly designing channel measurement reference signals with {4, 8} ports,
when the number of actual antenna ports is equal to 4 or 8, mapping the channel measurement reference signals with 4 or 8 ports on corresponding subcarriers such that the newly designed channel measurement reference signal with 4 or 8 ports achieves a downstream channel measurement of the long-term evolution advance system; and when the number of actual antenna ports is equal to 1 or 2, the common reference signal of the LTE a LTE system is reused by the channel measurement reference signal as a channel measurement reference signal, so as to achieve the downstream channel measurement of the long-term evolution advance system;

wherein the pattern of the channel measurement reference signal with 4 ports and that of the first 4 ports of the channel measurement reference signal with 8 ports are the same.

2. The method for sending a channel measurement reference signal according to claim 1, wherein newly designing channel measurement reference signals with $\{1, 2, 4, 8\}$ ports, wherein the pattern of the channel measurement reference signal with 1 port and that of the first port of the channel measurement reference signal with 2 ports are the same, the pattern of the channel measurement reference signal with 2 ports and that of the first 2 ports of the channel measurement reference signal with 4 ports are the same, and the pattern of the channel measurement reference signal with 4 ports and that of the first 4 ports of the channel measurement reference signal with 8 ports are the same.

3. The method for sending a channel measurement reference signal according to claim 1, wherein the patterns of channel measurement reference signals during different sending periods are the same.

4. The method for sending a channel measurement reference signal according to claim 1, wherein the channel measurement reference signal is sent on the $6^{th}$, $9^{th}$, and $14^{th}$ symbols of the configured subframe.

5. The method for sending a channel measurement reference signal according to claim 1, wherein the channel measurement reference signal is sent by taking a subframe of any number of 0, 2, 5, 10 or 20 as a period.

6. The method for sending a channel measurement reference signal according to claim 1, wherein the frequency domain space of the equal space that the channel measurement reference signal predetermined composition unit is repeated with is $\{6, 8, 12, 16, 24, 30, 36, 42, 48\}$.

7. The method for sending a channel measurement reference signal according to claim 1, wherein the newly designed channel measurement reference signals are sent repeatedly in full bandwidth with equal space by taking one RB as a predetermined composition unit, and the channel measurement reference signal with 8 ports is located on the $14^{th}$ OFDM symbol of the sending subframe, wherein the 0 port of the channel measurement reference signal and the 1-port of the channel measurement reference signal are mapped on the $1^{st}$ and $2^{nd}$ subcarriers adjacently, the 2-port of the channel measurement reference signal and the 3-port of the channel measurement reference signal are mapped on the $4^{th}$ and $5^{th}$ subcarriers adjacently, the 4-port of the channel measurement reference signal and the 5-port of the channel measurement reference signal are mapped on the $7^{th}$ and $8^{th}$ subcarriers adjacently, and the 6-port of the channel measurement reference signal and the 7-port of the channel measurement reference signal are mapped on the $10^{th}$ and $11^{th}$ subcarriers adjacently.

8. The method for sending a channel measurement reference signal according to claim 1, wherein the newly designed channel measurement reference signals are sent repeatedly in full bandwidth with equal space by taking two RBs as the predetermined composition unit, and the channel measurement reference signal with 8 ports is located on the $14^{th}$ OFDM symbol of the sending subframe, wherein the 0-port of the channel measurement reference signal is mapped on the $1^{st}$, $9^{th}$, and $17^{th}$ subcarriers, the 1-port of the channel measurement reference signal is mapped on the $2^{nd}$, $10^{th}$, and $18^{th}$ subcarriers, the 2-port of the channel measurement reference signal is mapped on the $3^{rd}$, $11^{th}$, and $19^{th}$ subcarriers, the 3-port of the channel measurement reference signal is mapped on the $4^{th}$, $12^{th}$, and $20^{th}$ subcarriers, the 4-port of the channel measurement reference signal is mapped on the $5^{th}$, $13^{th}$, and $21^{st}$ subcarriers, the 5-port of the channel measurement reference signal is mapped on the $6^{th}$, $14^{th}$, and $22^{nd}$ subcarriers, the 6-port of the channel measurement reference signal is mapped on the $7^{th}$, $15^{th}$, and $23^{rd}$ subcarriers, and the 7-port of the channel measurement reference signal is mapped on the $8^{th}$, $16^{th}$, and $24^{th}$ subcarriers.

9. The method for sending a channel measurement reference signal according to claim 1, wherein the newly designed channel measurement reference signals are sent repeatedly in full bandwidth with equal space by taking one RB as the predetermined composition unit, and the channel measurement reference signal with 8 ports is located on the $11^{th}$ and $14^{th}$ OFDM symbols of the sending subframe, wherein on the $11^{th}$ symbol, the 0-port and 1-port of the channel measurement reference signal are mapped on the $1^{st}$ and $2^{nd}$ subcarriers adjacently, the 2-port and 3-port of the channel measurement reference signal are mapped on the $4^{th}$ and $5^{th}$ subcarriers adjacently, the 4-port and 5-port of the channel measurement reference signal are mapped on the $7^{th}$ and $8^{th}$ subcarriers adjacently, and the 6-port and 7-port of the channel measurement reference signal are mapped on the $10^{th}$ and $11^{th}$ subcarriers adjacently; and on the $14^{th}$ OFDN symbol, the 0-port and 1-port of the channel measurement reference signal are mapped on the $7^{th}$ and $8^{th}$ subcarriers of the 14th symbol adjacently, the 2-port and 3-port of the channel measurement reference signal are mapped on the $10^{th}$ and $11^{th}$ subcarriers of the $14^{th}$ symbol adjacently, the 4-port and 5-port of the channel measurement reference signal are mapped on the $1^{st}$ and $2^{nd}$ subcarriers of the $14^{th}$ symbol adjacently, and the 6-port and 7-ports of the channel measurement reference signal are mapped on the $4^{th}$ and $5^{th}$ subcarriers of the $14^{th}$ symbol adjacently.

10. The method for sending a channel measurement reference signals according to claim 1, wherein the newly designed channel measurement reference signals are sent repeatedly in full bandwidth with equal space by taking two RBs as the predetermined composition unit, and the channel measurement reference signal with 8 ports is located on the $14^{th}$ OFDM symbol of the sending subframe, wherein the 0-port of the channel measurement reference signal is mapped on the $3^{rd}$ subcarrier, the 1-port of the channel measurement reference signal is mapped on the $6^{th}$ subcarrier, the 2-port of the channel measurement reference signal is mapped on the $9^{th}$ subcarrier, the 3-port of the channel measurement reference signal is mapped on the $12^{th}$ subcarrier, the 4-port of the channel measurement reference signal is mapped on the $15^{th}$ subcarrier, the 5-port of the channel measurement reference signal is mapped on the $18^{th}$ subcarrier, the 6-port of the channel measurement reference signal is mapped on the $21^{st}$ subcarrier, and the 7-port of the channel measurement reference signal is mapped on the $24^{th}$ subcarrier.

11. The method for sending a channel measurement reference signal according to claim 1, wherein the newly designed channel measurement reference signals are sent repeatedly in full bandwidth with equal space by taking one RB as the predetermined composition unit, and the channel measurement with 8 ports reference signal is located on the $6^{th}$ and $11^{th}$ OFDM symbols of the sending subframe, wherein the 0-port and 4-port of the channel measurement reference signal are mapped on the $1^{st}$ subcarrier, the 1-port and 5-port of the channel measurement reference signal are mapped on the $4^{th}$ subcarrier, the 2-port and 6-port of the channel measurement reference signal are mapped on the $7^{th}$ subcarrier, and the 3-port and 7-port of the channel measurement reference signal are mapped on the $10^{th}$ subcarrier.

12. The method for sending a channel measurement reference signal according to claim 1, wherein the channel measurement reference signal is sent repeatedly in full bandwidth with equal space by taking one RB as the predetermined composition unit, and the channel measurement reference signal with 8 ports is located on the $6^{th}$ OFDM symbol of the sending subframe, wherein the 0-port and 1-port of the channel measurement reference signals are mapped on the $1^{st}$ and $2^{nd}$ subcarriers adjacently, the 2-port and 3-port of the channel measurement reference signal are mapped on the $7^{th}$ and $8^{th}$ subcarriers adjacently, the frequency domain locations of the 4-port, 5-port, 6-port, and 7-port of the channel measurement reference signal are the same as those of the 0-port, 1-port, 2-port, and 3-port of the channel measurement reference signal respectively, and each port of the channel measurement reference signal is the same when being configured at different antenna ports and the mapping of channel measurement reference signals with 1, 2, 4, and 8 port(s) are supported at the same time.

13. The method for sending a channel measurement reference signal according to claim 1, wherein the channel measurement reference signal is sent repeatedly in full bandwidth with equal space by taking one RB as the predetermined composition unit, wherein the channel measurement reference signal with 8 ports is located on the $6^{th}$ and $11^{th}$ OFDM symbols of the sending subframe, the 0-port of CSI-RS is mapped on the $1^{st}$ subcarrier of the $6^{th}$ OFDM symbol, the 1-port of CSI-RS is mapped on the $4^{th}$ subcarrier of the $6^{th}$ OFDM symbol, the 2-port of CSI-RS is mapped on the $7^{th}$ subcarrier of the $6^{th}$ OFDM symbol, the 3-port of CSI-RS is mapped on the $10^{th}$ subcarrier of the $6^{th}$ OFDM symbol; the 4-port of CSI-RS is mapped on the $1^{st}$ subcarrier of the $11^{th}$ OFDM symbol, the 5-port of CSI-RS is mapped on the $4^{th}$ subcarrier of the $11^{th}$ OFDM symbol, the 6-port of CSI-RS is mapped on the $7^{th}$ subcarrier of the $11^{th}$ OFDM symbol, and the 7-port of CSI-RS is mapped on the $10^{th}$ subcarrier of the $11^{th}$ OFDM symbol.

14. The method for sending a channel measurement reference signal according to claim 1, wherein the channel measurement reference signal is sent repeatedly in full bandwidth with equal space by taking one RB as the predetermined composition unit, wherein the channel measurement reference signal with 8 ports is located on the $6^{th}$ and $11^{th}$ OFDM symbols of the sending subframe, the 0-port and 1-port of CSI-RS are mapped on the $1^{st}$ and $2^{nd}$ subcarriers of the $6^{th}$ OFDM symbol adjacently, the 2-port and 3-port of CSI-RS are mapped on the $7^{th}$ and $8^{th}$ subcarriers of the $6^{th}$ OFDM symbol adjacently, and the 4-port, 5-port, 6-port, and 7-port are mapped on the $11^{th}$ symbol, with the frequency domain locations thereof being the same as those of the 0-port, 1-port, 2-port, and 3-port respectively.

15. The method for sending a channel measurement reference signal according to claim 1, wherein the channel measurement reference signal is sent repeatedly in full bandwidth with equal space by taking one RB as the predetermined composition unit, wherein the channel measurement reference signal with 8 ports is located on the $6^{th}$ and $14^{th}$ OFDM symbols of the sending subframe, the 0-port and 1-port of CSI-RS are mapped on the $1^{st}$ and $2^{nd}$ subcarriers of the $6^{th}$ OFDM symbol adjacently, the 2-port and 3-port of CSI-RS are mapped on the $7^{th}$ and $8^{th}$ subcarriers of the $6^{th}$ OFDM symbol adjacently, and the 4-port, 5-port, 6-port, and 7-port are mapped on the $14^{th}$ symbol, with the frequency domain locations thereof being the same as those of the 0-port, 1-port, 2-port, and 3-port respectively.

16. A system for sending a channel measurement reference signal, comprising:

a sending module, configured to send the channel measurement reference signal of each port in one subframe or two adjacent subframes during one sending period and send the channel measurement reference signal of each port repeatedly in full bandwidth with equal space by taking at least one resource block (RB) as a predetermined composition unit;

wherein the sending module comprises:

a first channel measurement reference signal port number setting unit, configured to newly design channel measurement reference signals with {4, 8} ports, when the number of actual antenna ports is equal to 4 or 8, the channel measurement reference signals with 4 or 8 ports are mapped on corresponding subcarriers such that the newly designed channel measurement reference signal with 4 or 8 ports achieves the downstream channel measurement of the long-term evolution advance system, and when the number of actual antenna ports is equal to 1 or 2, the common reference signal of the LTE a LTE system is reused by the channel measurement reference signal as a channel measurement reference signal, so as to achieve the downstream channel measurement of the long-term evolution advance system, wherein the pattern of the channel measurement reference signal with 4 ports and that of the first 4 ports of channel measurement reference signal with 8 ports are the same.

17. The system for sending a channel measurement reference signal according to claim 16, wherein the sending module further comprises:

a second channel measurement reference signal port number setting unit, configured to newly design channel measurement reference signals with {1, 2, 4, 8} port(s), wherein the pattern of the channel measurement reference signal with 1 port and that of the first port of the channel measurement reference signal with 2 ports are the same, the pattern of the channel measurement reference signal with 2 ports and that of the first 2 ports of the channel measurement reference signal with 4 ports are the same, and the pattern of the channel measurement reference signal with 4 ports and that of the first 4 ports of the channel measurement reference signal with 8 port are the same.

18. The system for sending a channel measurement reference signal according to claim 16, wherein the patterns of the channel measurement reference signals during different sending periods are the same, the channel measurement reference signal is sent on the $6^{th}$, $9^{th}$, and $14^{th}$ symbols of the configured subframe, and the channel measurement reference signal is sent by taking a subframe of any number of 0, 2, 5, 10, or 20 as a period, and the frequency domain space of the equal space that the channel measurement reference signal predetermined composition unit is repeated with is {6, 8, 12, 16, 24, 30, 36, 42, 48}.

19. The system for sending a channel measurement reference signal according to claim 16, wherein it further comprises:
  a repeated sending unit, configured to repeatedly send the channel measurement reference signal and the newly designed channel measurement reference signals in full bandwidth with equal space by taking one or two RBs as the predetermined composition unit, wherein the channel measurement reference signal with 8 ports is located on the $14^{th}$ OFDM symbol of the sending subframe.

* * * * *